United States Patent
Belardinelli

[19]

[11] Patent Number: 5,880,713
[45] Date of Patent: Mar. 9, 1999

[54] PAPER HANDLING INSTRUMENT STORAGE UNIT WITH COMPUTER DATA-SAVING FEATURE

[76] Inventor: Alexander M. Belardinelli, 2800 E. Main St., Endwell, N.Y. 13760

[21] Appl. No.: 751,837

[22] Filed: Nov. 18, 1996

[51] Int. Cl.⁶ ..................................................... G09G 5/00
[52] U.S. Cl. ........................ 345/156; 361/679; 211/60.1; 211/69.1; D19/77; D19/81; D19/83; D14/113; D14/114; D14/115
[58] Field of Search ............................. 345/156; 361/681, 361/682, 683, 679; 348/836, 844; 248/918, 920; 178/18.01, 19.01; D19/75, 77, 81, 83, 84; D14/113, 114, 115; 211/60.1, 69.1

[56] References Cited

U.S. PATENT DOCUMENTS

| | | | |
|---|---|---|---|
| 4,501,931 | 2/1985 | Ohya et al. | 178/18 |
| 5,067,573 | 11/1991 | Uchida | 178/18 |
| 5,232,103 | 8/1993 | Koenig et al. | 211/69.5 |
| 5,422,442 | 6/1995 | Gouda et al. | 178/18 |
| 5,555,157 | 9/1996 | Moller et al. | 361/683 |
| 5,586,002 | 12/1996 | Notarianni | 361/681 |
| 5,635,959 | 6/1997 | Takeuchi et al. | 345/179 |
| 5,738,316 | 4/1998 | Sweere et al. | 248/123.11 |

*Primary Examiner*—Jeffery A. Hofsass
*Assistant Examiner*—Julie Lieu
*Attorney, Agent, or Firm*—Salzman & Levy

[57] ABSTRACT

The present invention features a paper handling instrument storage unit for use with a computer. The unit, fabricated from plastic, wood, metal, or other suitable material, has a tray that is mountable to a computer monitor near a computer keyboard, or to any other vertical wall, face, or upright on, in, or near a computer workstation. The mounted tray has assigned wells located in it, for containing pencils, pens, scissors, rulers, paper clips and other desk accessories. The wells are conveniently shaped to accommodate the various office items. In one embodiment, a photocell is positioned within the unit. Found within the unit's wells are a number of light passages. The light beam is interrupted when an instrument (e.g., a pencil or pen) rests within its assigned well. Removal of the instrument from its well allows the light beam in that passage to travel through the passage and reach a photocell detector. The photodetector provides a signal to the computer that initiates a data-saving program routine. Thus, when work on the computer keyboard is interrupted by an office worker reaching for a pencil or pen, for example, the data on the computer monitor screen is automatically saved.

17 Claims, 4 Drawing Sheets

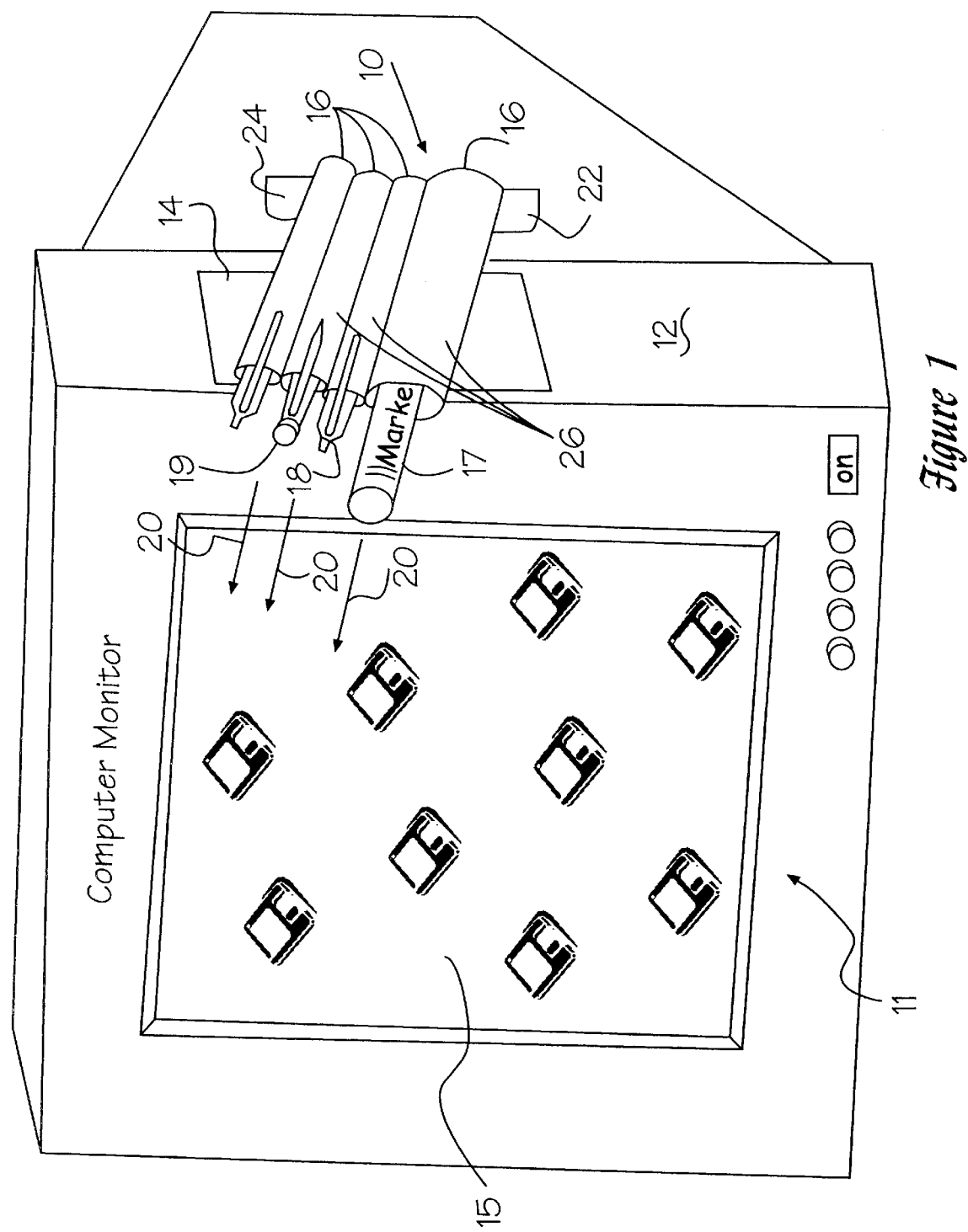

5,880,713

PAPER HANDLING INSTRUMENT STORAGE UNIT WITH COMPUTER DATA-SAVING FEATURE

FIELD OF THE INVENTION

The present invention pertains to paper handling instrument holders and, more particularly, to a paper handling instrument unit for computers, a unit that is ergonomically placed with respect to any given computer operator, and which, when in use, may comprise means for saving computer data.

BACKGROUND OF THE INVENTION

Pencil- and penholders exist on almost every work desk. Some office personnel prefer to keep their pencils and pens in a styled caddy. Others prefer to use a simple, cylindrically-shaped cup. Pencil- and penholders have been designed along with clocks, calendars and other accessory objects.

Now in the computer age, as many office workers are using computers, their usage of pencil- and penholders that rest upon a desk is ergonomically incorrect. It is disruptive to the computer operator, if, during computer usage, he or she has to reach a long distance for a pencil. It is necessary, therefore, to provide a container or storage device to store paper handling instruments for computers that is within easy reach of the keyboard or the computer monitor (i.e., in and around computer workstations).

One such ergonomic storage unit for computers is illustrated in U.S. Design Pat. No. 346,402 (issued to HASSEL et al on Apr. 26, 1994). The unit is shown therein as part of a compartmentalized tray that attaches to a computer keyboard. The tray is designed with variously shaped wells for holding paper clips, pencils, scissors and other office appurtenances. Such a tray is close to the computer operator, so that any interruption from computer typing to obtain a pencil or pen is easily accomplished.

U.S. Pat. No. 5,232,103 (issued to KOENIG et al on Aug. 3, 1993) describes a holder for chalk and erasers that affixes to a chalk board, black board or white board. The holder comprises a back plate that lies in the plane of the board itself, a plurality of receptacles being disposed on and supported by the back plate in a plane perpendicular to the plane of the plate and the board.

The present invention reflects the discovery that a mishap or an inadvertent consequence of reaching for a pencil, pair of scissors, paper clip or other desk accessory, can result in the loss of computer data. More often than not, an improper key is hit during the interruption of the typing. At such a time, it is not uncommon to lose the work that is on the computer screen.

The current inventor has developed an instrument container or storage unit for computers that is not only ergonomically correct, but also can automatically save, when in use, the computer data on the screen.

The invention features a paper handling instrument storage unit that preferably attaches to the side of a computer monitor, but can easily attach to the vertical side of any structure, such as a computer desk, its uprights, or to any substantially vertical wall or face conveniently accessible to a computer workstation. An internally placed photocell, disposed within the caddy, is actuated when an instrument (e.g., a pencil or pen) is removed from the unit. Actuation of the photodetector sends a signal to the computer that automatically triggers a data-saving program. In this fashion, an operator is assured that an interruption from his or her typing will not be the cause of a computer mishap. This simple assurance is a soothing palliative to any office worker who has ever experienced loss of computer data. Such a data-saving mechanism is far more useful than a mounted clock or calendar.

In an alternate embodiment, a unit is provided for holding not only pens and pencils, but also all other paper handling instruments, such as scissors, Post-It™ slips, rulers, adhesive tape, high-lighters, markers, erasers, glue, correction fluid and tape, etc. The unit is affixed, via adhesives, screws, tape, or any other suitable method or means, to the side of a computer monitor, as opposed to the monitor screen itself, so as not to obscure the information being displayed on the monitor.

SUMMARY OF THE INVENTION

In accordance with the present invention, there is provided a paper handling instrument storage unit for use with a computer. The unit comprises a tray that is mountable to a computer monitor, in proximity to the computer keyboard. The mounted tray has assigned wells disposed therein for containing pencils, pens, scissors, rulers, paper clips and other desk accessories. The wells are conveniently shaped to accommodate various desk accessories. An internally placed photocell is disposed within the unit. Disposed within the unit's wells are a number of light passages. The light beam is interrupted when an instrument (e.g., a pencil or pen) is situated within its assigned well. Removal of the instrument from its well allows the light beam in that passage to travel therethrough, reaching a photocell detector. The photodetector provides a signal to the computer that initiates a data-saving program routine. Thus, when work on the computer keyboard is interrupted by an office worker reaching for a pencil or pen, for example, the data upon the computer monitor screen is automatically saved.

BRIEF DESCRIPTION OF THE DRAWINGS

A complete understanding of the present invention may be obtained by reference to the accompanying drawings, when taken in conjunction with the subsequent, detailed description thereof, and in which:

FIG. 1 illustrates an in situ, perspective view of a paper handling instrument storage unit for computers, in accordance with the present invention;

For purposes of clarity and brevity, like elements and components will bear the same designations and numbers throughout the FIGS.

DESCRIPTION OF THE PREFERRED EMBODIMENT

Figure 1A:
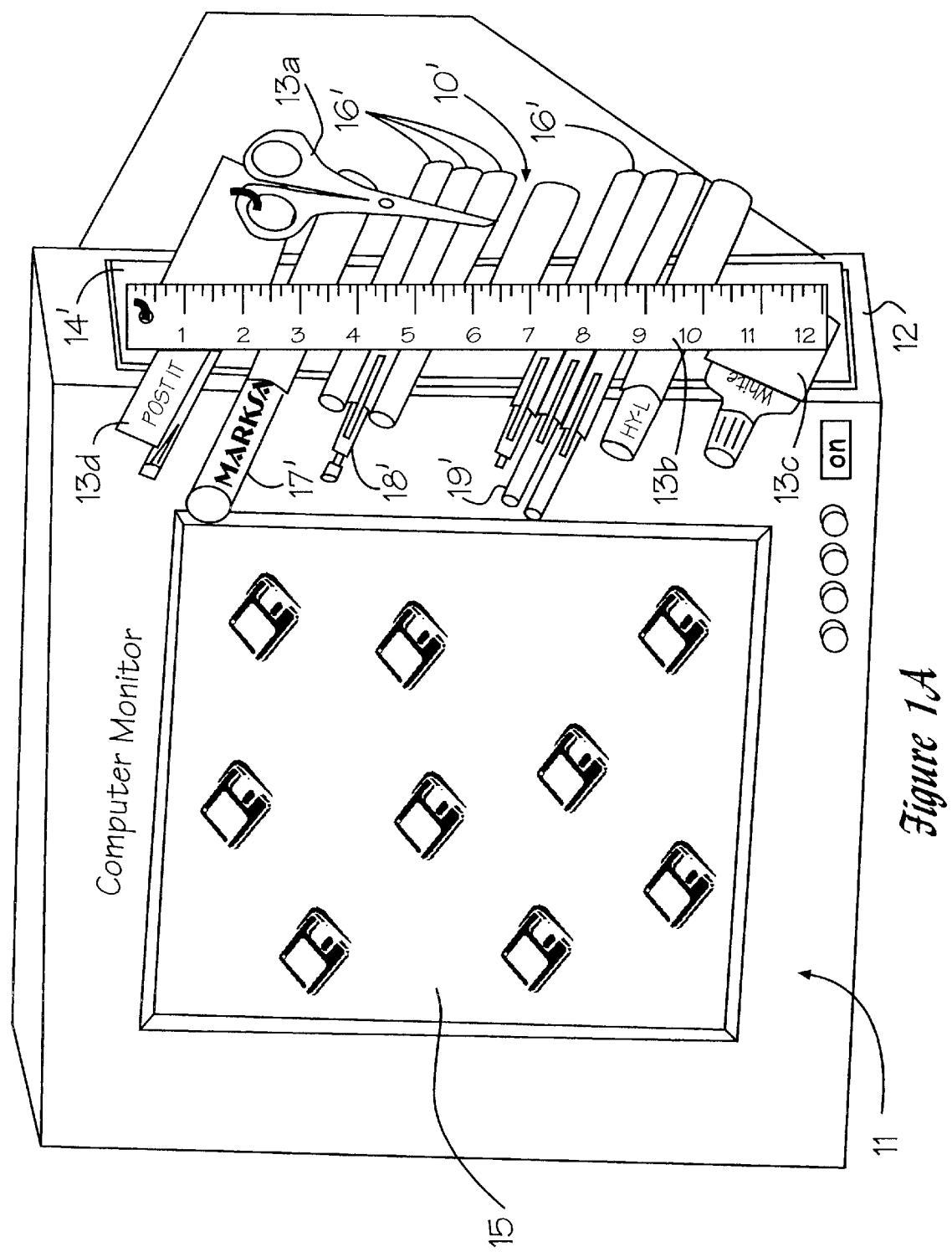
FIG. 1a illustrates an alternate, in situ embodiment of the paper handling instrument storage unit, which is adapted to hold conventional utensils, such as rulers, scissors, etc.

Generally speaking, the invention comprises an instrument storage unit for computers. The unit comprises a plurality of adjacent tubes or wells. Each well is designed in size and shape to accommodate and receive a particular desk item, such as a pencil, pen, scissors or felt-tip marker, etc. A photodetector, disposed adjacent the unit, is actuated when any tube is emptied by the withdrawal of its item. The actuated photodetector sends a signal to the computer to initiate a data-saving routine in the computer program. Thus, the data on the computer screen at the time of the removal of the item is then saved. Replacement of the implement into its tube resets the save routine for the next withdrawal of an instrument therefrom.

Now referring to FIG. 1, a computer monitor 11 is shown with an instrument storage unit 10 mounted on the side 12 by means of a unit mounting pad 14. The unit 10 can be fabricated from wood, metal, fabric, plastic, paper or any other suitable material capable of providing the necessary storage function herein described. It comprises a number of container tubes 16 that are shaped and sized to accommodate and receive different desk accessories such as a felt-tip marker 17, a mechanical pencil 18 and a pen 19, etc. The monitor 11 comprises a screen 15 that can contain data to be saved, when one of the items is removed from its respective container tube 16, as shown by arrows 20. The unit 10 comprises a light generator 22, which sends light beams through the unit's light passages that open to a light detector 24, as better observed with reference to FIG. 2.

Referring now to FIG. 1a, there is shown an alternate embodiment of the unit 10 shown in FIG. 1. The computer monitor 11 is shown with a storage unit 10' mounted on the side 12 by means of a mounting pad 14'. The unit 10' comprises a number of container tubes 16' that are shaped and sized to accommodate and receive different paper handling instruments, such as a felt-tip marker 17', a mechanical pencil 18', a pen 19', a pair of scissors 13a, a ruler 13b, correction fluid 13c, and a pad of Post-It™ slips 13d. The scope of the invention is intended to include a unit capable of storing any number and type of existing or future paper handling instruments, since the subject matter of this application is limited to the storage unit 10 and 10' and its relationship to the computer monitor 11, rather than to the paper handling items to be stored therein.

Figure 2:
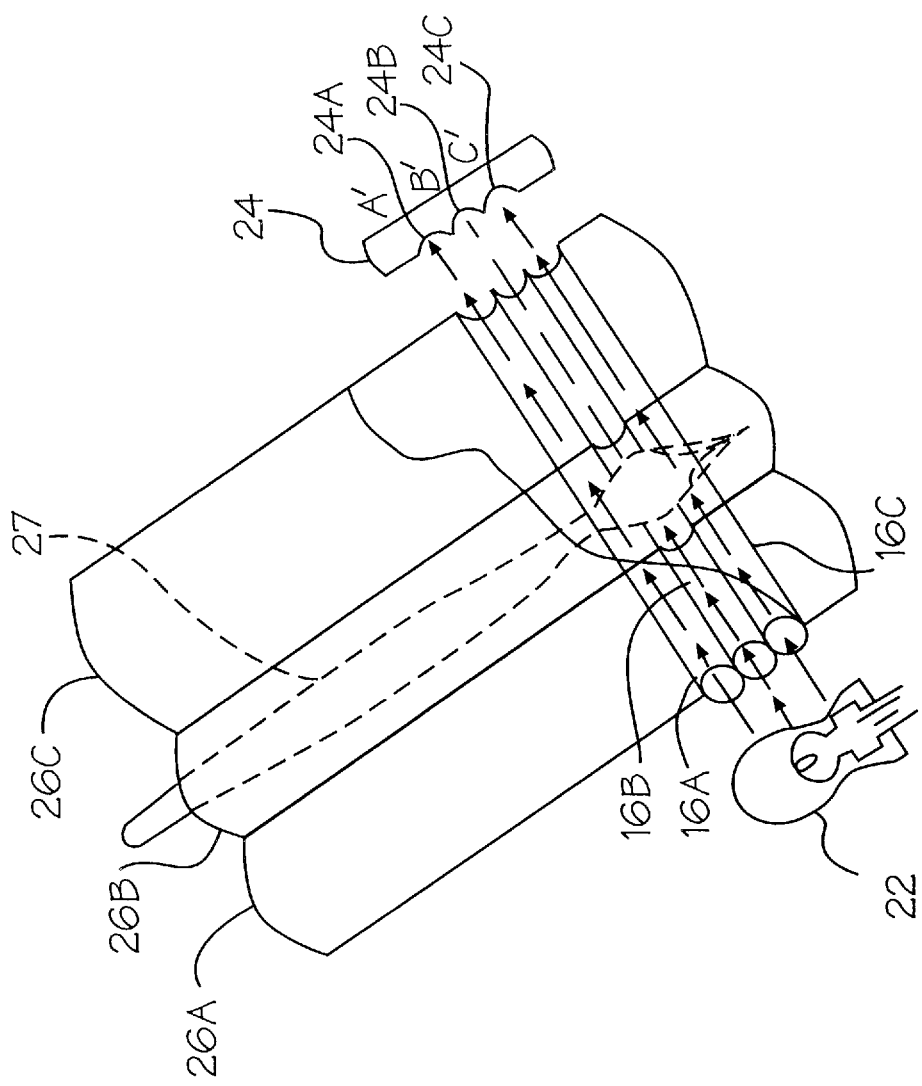
FIG. 2 depicts a schematic, cut-away view of one embodiment of a light-generating and -detecting apparatus used in the storage unit illustrated in FIG. 1.

Referring to FIG. 2, the unit 10 is shown with a series of individual light tube passages 26A, 26B, 26C, etc., each of which runs through a corresponding container tube 16A, 16B, 16C, etc. The container tube 26B is shown as containing a pen 27. Light beams generated by light generator 22 are focused down each light tube passage 16A, 16B and 16C. The light detector 24, disposed at the distal end of the light tube passages 16A, 16B, 16C, etc., comprises individual detector photocells 24A, 24B and 24C. The pen 27 disposed in container tube 26B blocks the passage of light through its individual light passage tube 16B, so that the photocell 24B is prevented from seeing the light beam that is generated by generator 22. Thus, in this position, the photocell 24B is not actuated. When the pen 27 is removed from its container tube 26B, the light beam will pass through the light passage tube 16B and contact the photocell 24B. The photodetector 24 will then become actuated and send a signal to the computer 30, as will be explained with reference to FIG. 3.

Figure 3:
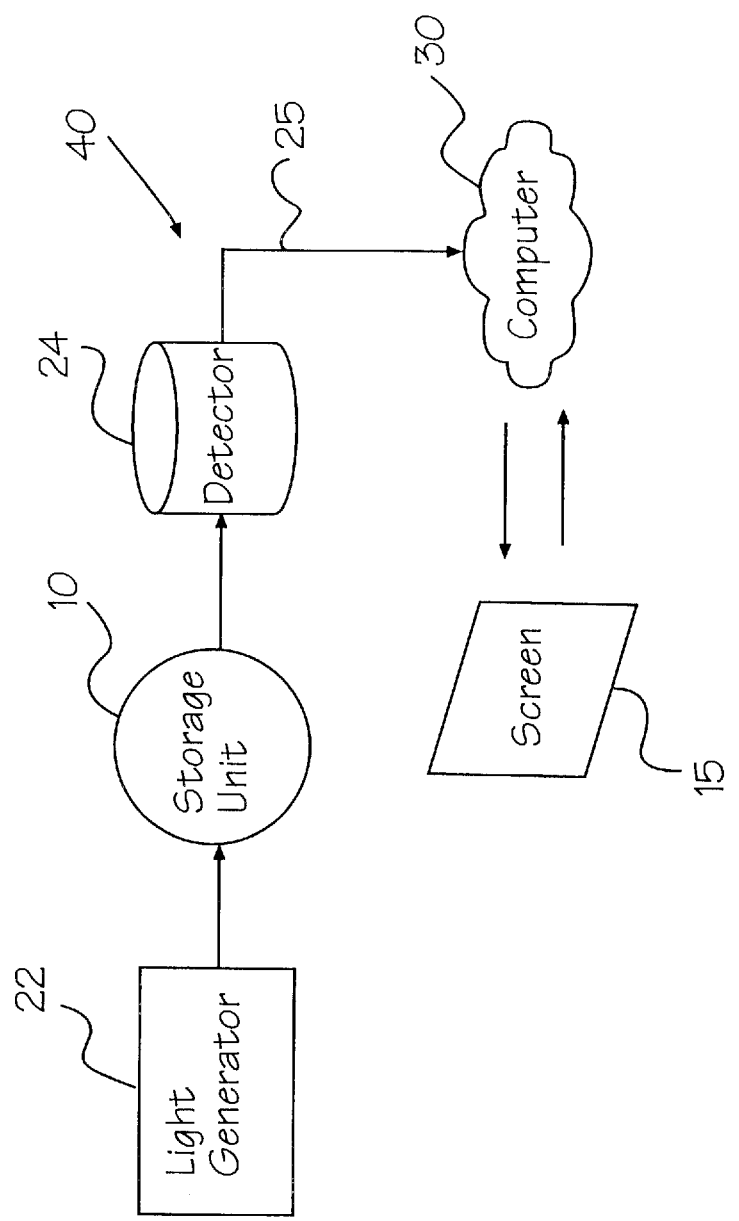
FIG. 3 shows a schematic, block diagram of the light circuitry of this invention.

Referring to FIG. 3, the light-actuating circuitry 40 of this invention is illustrated. The light generator 22 sends light down individual light passage tubes running through the unit 10. The light is normally blocked by pens, pencils, scissors, felt-tip markers, etc., contained in the individualized container tubes 26, each of which is assigned to a particular desk accessory. Light will reach one of the photocells of the detector 24 when a particular item (e.g., a pen 27) is removed from its respective container tube 26. The photocell then becomes actuated, and sends a signal to the computer 30, as shown by arrow 25. The signal initiates a data-saving routine that is part of the computer program. The data on the screen 15 of the monitor 11 is then saved. Replacement of the pen 27 into its container tube 26B deactivates the photocell 24B, and resets the photocell to initiate the signal with the subsequent removal of the pen.

The mounting pad 14 can comprises a peel-off tape for revealing an adhesive strip, as is well known in the art, for mounting to a computer monitor 11. The light generator 22 can comprise a plurality of LEDs (light-emitting diodes) that provide light for the photocells 24A, 24B, etc.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Having thus described the invention, what is desired to be protected by Letters Patent is presented by the subsequently appended claims.

What is claimed is:

1. A paper handling instrument storage unit for use with a computer, comprising:

a holder having individualized containers for holding respective desk accessories therein, with each container including means defining individual light passages therethrough, said holder having means for mounting in proximity to a computer keyboard;

light-generating means disposed adjacent said holder, for generating light for passage through each of said light passages;

light-detecting means disposed adjacent said holder and opposite to said light-generating means, for receiving light passing through any one of said light passages, said light-detecting means being actuated when a desk accessory is removed from said holder and said light passes through one of said light passages, said actuated light-detecting means generating a signal in response to detection of light in said light passage; and a computer for receiving said signal, said computer having a data-saving routine in its program that is initiated by said signal, whereby data on a computer screen is saved when a desk accessory item is removed from said holder.

2. The paper handling instrument storage unit in accordance with claim 1, wherein said individual containers are specifically designed to contain particular desk accessories.

3. The paper handling instrument storage unit in accordance with claim 1, wherein said means for mounting said holder comprises a mounting pad for mounting said holder to a side of a computer monitor.

4. The paper handling instrument storage unit in accordance with claim 1, wherein said light-generating means comprises a number of light-emitting diodes (LEDs).

5. The paper handling instrument storage unit in accordance with claim 1, wherein said light-detecting means comprises a number of photocells.

6. The paper handling instrument storage unit in accordance with claim 1 wherein each of said individualized containers has a base and at least one side, said holder has a back plate operatively connected to said side of each of said individualized containers, and said holder has means for mounting to the side of a computer monitor having a predetermined display plane, so that said individualized containers are oriented substantially perpendicular to said display plane of said monitor, and wherein said individual containers are individually shaped and sized to accommodate respective one of a variety of desk top accessories, including bottles of opaque fluid, pens, pencils, and highlighter markers.

7. The paper handling instrument storage unit in accordance with claim 6, wherein said individualized containers are disposed adjacent means for mounting a scissor and a ruler upon said holder.

8. The paper handling instrument storage unit in accordance with claim 7, wherein said unit is fabricated from plastic.

9. The paper handling instrument storage unit in accordance with claim 7, wherein said unit is fabricated from wood.

10. The paper handling instrument storage unit in accordance with claim 7, wherein said unit is fabricated from metal.

11. The paper handling instrument storage unit in accordance with claim 6, wherein said means for mounting said holder comprises adhesive.

12. The paper handling instrument storage unit in accordance with claim 6, wherein said means for mounting said holder comprises screws.

13. The paper handling instrument storage unit in accordance with claim 6, wherein said means for mounting said holder comprises tape.

14. The paper handling instrument storage unit in accordance with claim 6, wherein said means for mounting said holder comprises a mounting pad operatively connected to said back plate for mounting said holder to a side of a computer monitor.

15. The paper handling instrument storage unit in accordance with claim 14, wherein said mounting pad comprises adhesive material.

16. The paper handling instrument storage unit in accordance with claim 14, wherein said mounting pad comprises screws.

17. The paper handling instrument storage unit in accordance with claim 14, wherein said mounting pad comprises tape.

* * * * *